United States Patent Office 3,840,479
Patented Oct. 8, 1974

3,840,479
CATALYST PREPARATION
John W. Geus, Frans Erenslaan 20,
Geleen, Netherlands
No Drawing. Continuation of abandoned application Ser.
No. 883,587, Dec. 9, 1969. This application June 20,
1972, Ser. No. 264,587
Int. Cl. B01j 11/24, 11/46
U.S. Cl. 252—471                    8 Claims

ABSTRACT OF THE DISCLOSURE

The present invention relates to a process of preparing a catalyst mass containing iron, and if desired nickel, cobalt, zinc and/or manganese, comprising precipitating the active element(s) together from an aqueous solution containing ions in the bivalent state onto a supporting material suspended in the solution. The iron ions are gradually and homogeneously converted from the bivalent iron ions to the trivalent form at a pH in the range 2 to 6.5, under controlled conditions of temperature whilst agitating the solution. The said loaded carrier material is subsequently separated from the liquid, washed and dried, and subjected if necessary to a further thermal treatment.

During the precipitation the pH is maintained at the value in the range 2 to 6.5 by introducing in the solution an alkaline solution.

The iron ions are converted from the bivalent to the trivalent form by the presence of nitrate ions in the solution at a temperature above 15° C. By preference a solution of an oxidation agent e.g. sodium nitrite, is gradually introduced into the suspension of the carrier material in the solution containing bivalent metal ions. The amount of the oxidation agent present in the solution is so adjusted that the increase of the amount of ferric ions in the suspesnion is not more than 0.05 mole per litre/per minute, and the deviations around the mean change do not exceed 0.001 mole per litre.

---

This application is a continuation of U.S. application Ser. No. 883,587, filed Dec. 9, 1969, now abandoned.

This invention relates to a process of preparing a catalyst mass containing iron, and if desired one or more other metals hereinafter described by precipitation from an aqueous solution, ions of the metal(s) in the bivalent state, onto a supporting material suspended in the solution, and also relates to catalyst systems prepared by such process, and artefacts derived from or containing catalytically active material prepared by the process of the invention.

The U.S. patent application 721,051, abandoned in favor of continuation-in-part application 108,081, filed Jan. 20, 1971, now abandoned in favor of continuation application 361,492, filed May 18, 1973, describes a process in which particles of one or more catalytically active elements are applied to a finely divided supporting material by causing a compound of the catalytically active element to be precipitated in an aqueous solution which contains a salt of the catalytically active element and in which the carrier material is suspended, the precipitation being effected by the controlled increase of hydroxyl ions in the solution at such a gradual rate that the speed with which the compound to be precipitated migrates to the surface of the supporting material is sufficiently high to prevent formation of precipitation nuclei in the solution, so that this compound is deposited exclusively on the suspended supporting material as an insoluble compound.

If a catalyst is desired which contains iron and one or more of the metals nickel, cobalt, zinc or manganese as catalytically active elements, it is necessary to start from a solution containing the iron exclusively in the bivalent form. Trivalent iron precipitates at a pH less than 2, whereas nickel hydroxide and cobalt hydroxide do not start precipitating until a pH value of 6 has been reached. Bivalent iron however does not precipitate until the pH has reached a value of 6 to 7, so that the condition of coprecipitation with other ions precipitating in this pH range can be satisfied according to the said process only by this hydroxide.

Although the abovementioned process yields excellent results, it has some disadvantages. The hydrated mixed oxides show a strong tendency to form large crystals which grow in size on the supporting material, which in the first stage of the precipitation process is homogeneously loaded. As a result it is difficult to obtain, at a high degree of loading of the supporting material, particles of very small size which are required for many catalytic reactions.

By the process according to the present invention, the iron, whether or not together with one or more of the said other metals present in the solution in the bivalent form, are coprecipitated in the agitated solution onto the suspended carrier material by bringing the bivalent iron ions gradually and homogeneously to the trivalent state at a pH value ranging between 2 and 6.5 under controlled conditions of temperature. After precipitation catalyst mass is separated from the liquid, washed and dried, and subjected if necessary to a further thermal treatment for example a calcination process which may be followed by a complete or partial reduction of the precipitated material.

The process of the invention is based on the reaction:

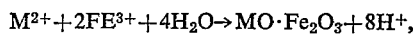

$$M^{2+} + 2Fe^{3+} + 4H_2O \rightarrow MO \cdot Fe_2O_3 + 8H^+,$$

in which the Fe(III) ions are generated in a solution whose acidity is so adjusted that the solubility product of Fe(II) hydroxide is not exceeded, while under the prevailing conditions the solubility of hydrated oxides containing Fe(III) is negligible.

The present invention is directed to precipitation of $MO \cdot Fe_2O_3$ on a carrier material suspended in the solution, where M is iron, nickel, cobalt, zinc, or manganese. In carrying out the invention the Fe(III) ions are generated homogeneously and gradually in the suspension of the carrier material in the solution containing metal ions. By "homogeneously" is meant that the concentration of bivalent and of trivalent ions does not significantly vary at any point in the solution. By "gradually" is meant that the rate at which trivalent ions are formed from bivalent iron ions is smaller than the rate at which the compound (or compounds) to be precipitated can migrate from the bulk of the solution to the surface of the suspended carrier material. Owing to the fact that the Fe(III) ions form precipitate according to the reaction equation mentioned above, the concentration of the Fe(III) ions in solution will remain substantially constant during the precipitation process.

The pH of the solution is maintained at a value ranging between 2 and 6.5 throughout the precipitation process which is carried out under controlled temperature conditions. To achieve this it may be necessary to neutralize the hydrogen ions set free during the reaction, for example by injecting an alkaline solution of soda, sodium bicarbonate, ammonia or a similar substance into the solution (suspension). The pH is kept at a constant value, preferably through control by a pH-meter. By "injection" is meant that the alkaline solution is brought into contact with the reacting solution without any other phase being in the immediate vicinity. By "controlled temperature" is understood here that either a set temperature value, or the variation of temperature with time, is adapted to the required conditions of precipitation.

The bivalent metal used may be the ferrous ion itself, whereby $FeO \cdot Fe_2O_3 = Fe_3O_4$ (magnetite) precipitates.

To obtain particularly useful catalysts it is preferred to coprecipitate one or more bivalent metals with the ions as hereinbefore mentioned. The precipitation under controlled conditions of temperature is continued for such a period of time that the required amount of metal ions present in the solution is precipitated. The chemical composition of the coprecipitate to be prepared depends on the metal(s) present in the initial solution and on the molecular proportions thereof. The loaded carrier material can subsequently be very easily separated from the liquid by filtration, if required after decantation, so that the process of the invention may be applied on an industrial scale.

The iron can be converted from the bivalent to the trivalent form by the presence of nitrate ions in the solution, preferably of ammonium nitrate, at a controlled temperature exceeding room temperature. However oxidants other than nitrates may be used, such as for example ions of halogenoxy-acids.

When employing a nitrate as oxidant, the reaction may be initiated at a temperature above 15° C. as follows:

$$3Fe^{2+} + NO_3^- + 4H^+ \rightarrow 3Fe^{3+} + 2H_2O.$$

Urea may be added to the solution to remove the hydrogen ions. Carbonate ions may be formed due to the gradual hydrolysis of the urea to ammonium carbonate which remove the hydrogen ions by the reaction according to the equation

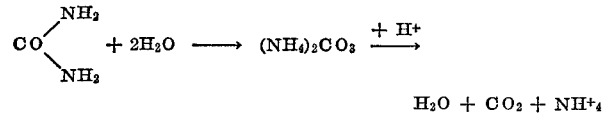

$$CO\begin{matrix}NH_2\\ \\NH_2\end{matrix} + 2H_2O \longrightarrow (NH_4)_2CO_3 \xrightarrow{+H^+} H_2O + CO_2 + NH_4^+$$

Adjustment of the pH at the required value at the beginning of the reaction is preferably done with nitric acid. In common with ammonium nitrate, urea or ammonia solution, nitric acid does not leave any residue in the product.

The above-mentioned processes have the disadvantage that the precipitation of the iron compound takes much time, which is less attractive in industrial applications. This disadvantage can be avoided by gradually introducing into the solution in which precipitation is to take place a solution of a strong oxidation agent, e.g. potassium permanganate or sodium nitrite. The introduction of the oxidation agent into the suspension is effected without another phase being in the immediate vicinity.

When potassium permanganate is used as the oxidising agent an additional effect is produced by the incorporation of manganese ions in the catalyst to be prepared. As manganese and iron containing catalysts have properties which make them suitable for particular applications, these materials can be prepared in a simple way by the process of the invention.

It is necessary that the rate at which the oxidation agent is introduced into the solution is such that the bivalent iron ions are gradually and homogeneous converted to the trivalent state. This may be achieved if the amount of oxidation agent present in the solution is so adjusted that the increase of the amount of iron(III) ions in the suspension is not higher than 0.05 mole per litre and per minute, and the deviations around the mean change do not exceed 0.001 mole per litre.

Owing to the fact that the Fe(III) ions from precipitates according to the reaction equation mentioned above, the total concentration of the Fe(III) ions both in solution and precipitated will remain substantially constant.

The increase of the amount of iron(III) ions in the suspension is considered gradual if the increase is not more than 0.05 mole per litre of solution per minute. The concentration is considered homogeneous if the deviations around the mean change do not exceed 0.001 mole per litre of solution, since nowhere in the solution or the suspension will there be larger concentration differences.

The catalytically active material prepared by the process according to the invention can be used in a finely divided state, but it can also be moulded into artefacts, or porous bodies therefrom. The following Examples of the invention are provided of the preparation of catalysts for use in ammonia synthesis. Although silica is used as the catalyst support in the Examples, alternative materials which may be used include for example $Al_2O_3$, $TiO_2$, $ThO_2$, clays and kieselguhr. Catalysts other than ammonia synthesis catalysts can be prepared.

EXAMPLE I

Preparation of a cobalt-iron catalyst 8.0 grammes of $CoCl_2 6H_2O$ and 60 g. of urea were dissolved in 3 litres of water, and 4 g. of silica of specific surface area 380 sq. m./g.$^{-1}$ obtained under the trademark "Aerosil 380" was suspended in the solution. The suspension was then boiled to remove dissolved oxygen, and after cooling acidified with nitric acid until the pH of the solution reached 2.0. Subsequently 490 ml. of a ferrous chloride solution containing 34 g. of iron and 25.7 g. of ammonium nitrate were added. The suspension was then heated for 30 hours at 100° C. in a nitrogen atmosphere, during which heating the colour of the suspension quickly changed from pink to deep-black. At the same time, the pH of the solution rose to about 5, and stayed at this value for about 25 hours after which the pH slowly rose to about 6, whereup the precipitation was complete.

The black precipitate formed settled rapidly and was easily filtered and washed out. The filtrate did not contain any cobalt or iron. After filtration, washing, and drying for 16 hours at 120° C., the preparation showed an X-ray diffraction pattern analogous to that of $Fe_3O_4$ (magnetite) with sharply defined reflections. Electromicroscopic examination showed the preparation to consist solely of relatively large particles greater than 1000 A. together with very small particles about 70 A.

The catalyst thus prepared was tested for the synthesis of ammonia after first being subjected to a 16-hour heating in air at a temperature of 940° C. The catalyst of screen size 1–2 mm. was then exposed to a synthesis gas mixture of $H_2/N_2$ ratio of 3/1 at 500° C. for 16 hours whereby reduction of the oxides was effected and the effectiveness of the reduced catalyst evaluated at atmospheric pressure with the following results:

| Temperature (° C.): | Space velocity, vol./vol./h. | Effectiveness, $P_{NH_3}/P_{NH_3 eq.}$ | Catalyst activity, $k$ |
|---|---|---|---|
| 457.5 | 26,200 | 91.7 | 24,000 |
| 430.5 | 24,300 | 70.3 | 8,280 |
| 399.5 | 20,100 | 46.8 | 2,480 | where $k = \frac{1}{2} p^{\frac{1}{2}} \cdot SV \cdot \ln(1-\eta)$, in which

P = overall pressure of the reaction gas, in bars;
SV = space velocity;
$\eta$ = effectiveness of the catalyst.

After these measurements the catalyst was again exposed to the synthesis gas at 500° C. for 40 hours, at a space velocity of 6000 v./v./h., after which the measurements were repeated. The activity of the catalyst had increased as shown by the following results

| | Space velocity, vol./vol./h. | Effectiveness, $P_{NH3}/P_{NH3eq.}$ | Catalyst activity, $k$ |
|---|---|---|---|
| Temperature (° C.): | | | |
| 429 | 25,800 | 82.6 | 14,700 |
| 405.5 | 24,400 | 57.9 | 5,350 |
| 382 | 24,800 | 29.6 | 1,135 |
| 364 | 14,750 | 17.6 | 200 |

After these runs the catalyst was passivated by passing over it a nitrogen-hydrogen mixture containing 0.5% $O_2$, and then exposed again at 450° C. for 24 hours to a stream of the synthesis mixture at a space velocity of 4000 v./v./h. The catalyst was subsequently found to have completely regained the activity shown in the second run.

EXAMPLE II

Preparation of cobalt-manganese-iron catalyst, using potassium permanganate as oxidizing agent 12.5 g. of Aerosil silica of specific surface area 200 m.$^2$ g.$^{-1}$ were suspended in a solution of 59.3 g. of $Co(NO_3)_2 \cdot 6H_2O$ in 24 litres of water and boiled to remove dissolved oxygen and cooled under nitrogen. Thereafter 1.613 litres of an acidic iron(II) chloride solution containing 200 g. of iron were added to the suspension. The suspension was then heated to 85–90° C., the final pH being 1.4.

After introduction of a 25% solution of ammonia, the pH of the hot suspension increased to 5.6, after which a solution of 115.1 g. of $KMnO_4$ in 2.3 litres of water was gradually introduced over a period of 188 minutes. By means of the simultaneous introduction of further 25% ammonia, the pH was maintained at 5.6. The amount of permanganate added was $1.62 \times 10^{-4}$ moles/litre/min., which caused the amount of iron(III) ions in the suspension to rise by $8.1 \times 10^{-4}$ moles/litre/min.

The ferrite-loaded carrier material was filtered, washed and dried at 120° C. Analysis showed the material to have the following composition: iron 48.7% wt., cobalt 2.9% wt., manganese 9.3% wt. and silica 2.3% wt. The material may be treated to effect reduction, for example as described in Example I.

EXAMPLE III

Preparation of a cobalt-iron catalyst, using sodium nitrite as oxidizing agent 21 g. of the silica used in Example II were suspended in a solution of 98.8 g. of $Co(NO_3)_2 \cdot 6H_2O$ in 24 litres of water. The suspension was boiled to remove dissolved oxygen and cooled under nitrogen. Thereafter 3.225 litres of an acidic iron(II) chloride solution containing 400 g. of iron were added to the suspension, and the suspension heated to 90–95° C., the final pH being 1.3.

After introduction of a 25% solution of ammonia, the pH of the hot suspension increased to 5.5, after which a solution of 247 g. of $NaNO_2$ in 1.5 litres of water was gradually introduced over a period of 144 minutes. By means of the simultaneous introduction of further 25% ammonia, the pH was maintained at 55. The amount of nitrite added was $1 \times 10^{-3}$ moles/litre/min. which caused the amount of iron(III) ions in the suspension to rise to $3 \times 10^{-3}$ moles/litre/min. About 1 hour after the start of the introduction of the nitrite solution, the pH rose rapidly to 6.5, after which the introduction of ammonia was stopped.

The carrier material loaded with cobalt ferrite was isolated by filtration, washed and dried at 120° C. Analysis showed the material to have the following composition: iron 63.3% by weight, cobalt 3.6% wt., and silica 2.5% wt. The material may be treated to effect reduction, for example as described in Example I.

EXAMPLE IV

Preparation of an iron catalyst using sodium nitrite as oxidising agent 21 g. of the silica used in Example II were suspended in 23 litres of boiled water and cooled under nitrogen. Thereafter 3.88 litres of an acidic iron(II) chloride solution containing 400 g. of iron were added, and the suspension heated to 96° C., after which the pH was adjusted to 5.5 by means of 25% ammonia.

A 25% solution of ammonia together with a solution of 246 g. of $NaNO_2$ dissolved in 1.5 litres of water, were gradually introduced over a period of time of 144 min. After 72 min. the pH rose to 5.7 whereupon the introduction of ammonia was stopped. The amount of nitrite added to the suspension was $1 \times 10^{-3}$ moles/litre/min. Reaction of the nitrite effected an increase of the amount of iron(III) ions in the suspension of $3 \times 10^{-3}$ moles/litre/min.

The carrier material loaded with iron oxide was isolated by filtration and washed and dried at 120° C. Analysis showed the material to have the following composition: iron 67.5% by weight, silica 4.8% wt. The material may be treated to effect reduction, for example as described in Example I.

What is claimed is:

1. A process for the preparation of a catalyst mass having a catalytically active component precipitated onto a finely divided particulate, inorganic supporting carrier material, wherein said catalytically active component is in the form of $MO \cdot Fe_2O_3$ where M represents a bivalent metal selected from the group consisting of iron, nickel, cobalt, zinc and manganese, said process comprising:
   forming a suspension of said finely divided particulate, inorganic supporting carrier material in an aqueous solution containing iron ions in the bivalent state and ions of at least one of said bivalent metals;
   gradually and homogeneously converting at least a portion of said iron ions in the bivalent state to the trivalent state while agitating said suspension in the absence of molecular oxygen, and maintaining the pH of said aqueous solution in the range of 2 to 6.5, said gradual and homogeneous conversion proceeding at a rate such that
      the increase in the amount of said iron ions in the trivalent state in said suspension is no greater than 0.05 moles per liter per minute; and
      the difference in concentration of said iron ions in the trivalent state between any two points in said aqueous solution does not exceed 0.001 moles per liter of solution;
   whereby said catalytically active component is caused to precipitate onto said supporting carrier material forming said particulate catalyst mass, said particulate catalyst mass being thereafter separated from said aqueous solution and dried.

2. The process of claim 1 wherein said iron ions in the bivalent state are converted to said trivalent state in the presence of nitrate ions at a temperature greater than 15° C.

3. The process of claim 2 wherein said nitrate ions are formed from ammonium nitrate dissolved in said aqueous solution.

4. The process of claim 1 wherein the pH of said aqueous solution is maintained in the range of 2 to 6.5 during said gradual and homogeneous conversion through the injection of an alkaline solution into said aqueous solution.

5. The process according to claim 1 wherein urea is added to said aqueous solution prior to said homogeneous conversion.

6. The process of claim 1 wherein an oxidation agent is gradually injected into said aqueous solution so as to homogeneously convert said iron ions in the bivalent state to said trivalent state.

7. The process according to claim 6 wherein said oxidation agent is sodium nitrite.

8. The process of claim 1 wherein said catalyst mass is treated with a reducing agent subsequent to said separation from said aqueous solution.

References Cited

UNITED STATES PATENTS

| | | | |
|---|---|---|---|
| 2,605,275 | 7/1952 | Kearby | 260—449.6 |
| 2,781,325 | 2/1957 | Rottig | 252—472 |
| 3,407,149 | 10/1968 | Taylor | 252—466 |
| 3,276,894 | 10/1968 | Hund | 106—304 |

FOREIGN PATENTS

| | | | |
|---|---|---|---|
| 6705259 | 10/1968 | Netherlands | 252—466 J |

DANIEL E. WYMAN, Primary Examiner

P. E. KONOPKA, Assistant Examiner

U.S. Cl. X.R.

252—62.56, 62.62, 457, 459, 466 J, 472, 473; 423—362

UNITED STATES PATENT OFFICE
CERTIFICATE OF CORRECTION

Patent No. 3,840,479　　　　　　　　　Dated October 8, 1974

Inventor(s) John W. Geus

It is certified that error appears in the above-identified patent and that said Letters Patent are hereby corrected as shown below:

Please correct the omission from the heading of U. S. Patent 3,840,479 by inserting the following:

--Claims priority, Netherlands Application No. 6,817,650, filed December 9, 1968.--

Signed and sealed this 27th day of May 1975.

(SEAL)
Attest:

RUTH C. MASON
Attesting Officer

C. MARSHALL DANN
Commissioner of Patents
and Trademarks